Patented Aug. 6, 1940

2,210,461

UNITED STATES PATENT OFFICE 2,210,461

SYNTHETIC RESIN PRINTING INK

Thomas A. Martone and Charles S. Rowe, Wilmington, Del., assignors to E. I. du Pont de Nemours & Company, Wilmington, Del., a corporation of Delaware No Drawing. Application October 5, 1937, Serial No. 167,474

8 Claims. (Cl. 260—29)

This invention relates to printing inks, more particularly it relates to printing inks which dry by evaporation and absorption rather than by any chemical drying action of oils.

Prior to this invention, natural resins or gums have been incorporated in rotogravure or intaglio inks but the products were not satisfactory for many purposes. The natural resins or gums or binders, for example, were dissolved in suitable volatile solvents and pigments or coloring materials added. These inks have been restricted in usage because of the limited solubility of the natural resins and gums and because of the high viscosity and tackiness imparted to the ink compositions, and for other reasons. On account of the limited solubility of the natural gums and resins, a low luster effect was usually obtained when substantial amounts of pigments or coloring matter were added.

This invention has for an object the preparation of an improved rotogravure or intaglio ink free from the above disadvantages. A further object is the preparation of an ink composition which has a high gloss, is free from tackiness, and has a low viscosity. A still further object is the preparation of a quick drying ink which has a high tolerance for pigments and coloring materials. Still other objects will appear hereinafter.

The above and other objects are accomplished by incorporating in an ink composition a resinous polymer of dihydronaphthalene. The resin can be dissolved in the usual solvents and incorporated in printing ink compositions in the usual manner.

The resinous polymers of dihydronaphthalene used according to this invention are colorless and transparent. They may be prepared by reacting a dihydro derivative of a hydrocarbon selected from the class consisting of acenaphthene and naphthalene and the homologues thereof with an alkali metal addition compound of one of said hydrocarbons, and hydrolyzing the reaction products. A more detailed method of preparing the same is described in a co-pending application of Scott and Walker, Serial No. 736,960. The physical properties are likewise more fully given in the application referred to. The melting point of the resin used is significant in the following respects only: (1) It must be higher than any temperature to which the printed paper will be submitted so that the print will not run and (2) It must not be too high as to be insoluble in the solvent. Thus, the resin obtained by carrying out the polymerization at 20° to 30° C. and melting at about 100° C. gives good results. Excellent results are obtained if the higher polymers from which the dimers have been removed, such as the polymer having a molecular weight of at least 400 and melting point of 97° to 103° C., are used. The pure colorless transparent resins are preferred. However, the impure light yellow colored resins have considerable utility.

This resin can be dissolved in solvents such as benzene, toluene, mineral spirits or solvent naphtha. The resin is quite soluble in all of these solvents and gives what may be termed a "short" ink with low viscosity and minimum tackiness which makes this resin outstanding for intaglio or rotogravure printing. We mention the shortness of the ink because most natural gums and resins have a tendency to be sticky and when printed at a rapid rate of speed tend to pull the surface from the ordinary rotogravure type of paper. There are other properties that are to be considered in rotogravure printing as inks of this kind must not fill in or clog up the etchings of the printing roll. It was found that inks could be prepared from dihydronaphthalene polymer using from 20 to 75% resin, at the same time having a viscosity that would be suitable for printing. It was also found that by the use of heat to quickly eliminate the solvent there was little penetration into the paper and the finish was improved. By this method of application the finish was higher than ordinary oil printing inks.

The invention will be further understood but is not intended to be limited by the following examples in which the parts are parts by weight.

Example I

Thirty-four parts of the substantially colorless, dihydronaphthalene polymer having a melting point of about 100° C. were dissolved in 25 parts of solvent naphtha. Five parts of "Lithosol" Fast Yellow HN Powder were added and the mass thoroughly mixed. This ink when printed on paper produced a print which had high gloss, satisfactory penetration and which dried quickly. A similar ink in which rosin was used as the binder was much lower in gloss and was such a heavy ink that the paper was pulled from the rolls.

Example II

Fifty parts of the higher dihydronaphthalene polymer having an average molecular weight of at least 400, melting point of 97° to 103° C., refractive index of approximately 1.60 and density of about 1.0 was dissolved in 50 parts of solvent naphtha. Five parts of the pigment known commercially as toluidine toner was then ground into the resin solution. A red ink having excellent properties was obtained.

In place of the resins mentioned above can be substituted other polymers of dihydronaphthalene and equivalent compounds either in a substantially pure or crude form.

Any pigment ordinarily used in inks of the character described, such as the usual organic lakes and toners or inorganic pigments either colored or white, can be substituted for those given in the examples. As further examples of pigments, mention is made of Iron Blue, Carbon Black, Copper Phthalocyanine, Pigment Scarlet Lake and Sienna.

Similarly, other solvents may be used, such as: benzene, toluene, kerosene, gasoline, petroleum spirits, xylene and chlorinated hydrocarbons such as trichloroethylene, carbon tetrachloride, etc. The last mentioned compounds are preferred, because of their non-inflammability characteristics. The rate of evaporation of the ink is, of course, dependent upon the particular solvent or mixture used.

The proportion of resin to solvent and the amount of pigment may be varied over wide ranges in order to obtain proper ink effects. As previously stated, 20 to 75% of resin and even higher can be used.

Other usual ingredients of printing ink compositions may be incorporated in our compositions.

Some of the advantages of this invention over the prior art are listed below:

1. High finish of print with a minimum amount of resin.
2. Viscosity of ink such that the paper does not pull from the roll due to tackiness of the ink. Inks made by the prior art were high in resin content in order to obtain sufficient gloss. This resulted in a very tacky "long" ink which, of course, is not desirable.
3. Since this resin is colorless and transparent the color of the pigment added is not impaired.
4. The resin is soluble in a wide variety of solvents such as are desirable for rotogravure printing. Natural resins have a limited solubility in many of these solvents.
5. Dihydronaphthalene resin gives a higher gloss than natural resins or gums when used in the presence of hot drying rolls on a high speed printing machine. This is mentioned as some of the rotogravure machines have a hot roll over which the printed paper is run after being printed.

While we have disclosed the preferred embodiments of our invention, it will be readily apparent to those skilled in the art that many variations and modifications may be made therein without departing from the spirit of the invention. Accordingly, the scope of the invention is to be limited solely by the appended claims construed as broadly as permissible in view of the prior art.

We claim:

1. A rotogravure printing ink containing as binder 20 to 75% of a resinous polymer of dihydronaphthalene obtained from a dihydro derivative of a hydrocarbon selected from the class consisting of acenaphthene and naphthalene and homologues thereof.

2. A rotogravure printing ink comprising a solvent, a coloring matter, and as binder 20 to 75% of a resinous polymer of dihydronaphthalene obtained from a dihydro derivative of a hydrocarbon selected from the class consisting of acenaphthene and naphthalene and homologues thereof.

3. A rotogravure printing ink which comprises a solvent, a coloring matter, and 20 to 75% of a solid resinous polymer of a dihydronaphthalene hydrocarbon.

4. A low viscosity rotogravure printing ink which comprises a solvent, a coloring matter, and 20 to 75% of a solid resinous polymer of a dihydronaphthalene hydrocarbon having a melting point of about 100° C.

5. A rotogravure printing ink capable of producing prints of high gloss with small proportion of binder which comprises a volatile solvent, a pigment, and 20 to 75% of a resinous polymer of dihydronaphthalene having an average molecular weight of at least 400.

6. A rotogravure printing ink as in claim 5, in which the resinous synthetic binder is substantially free of dimers.

7. A rotogravure printing ink capable of producing prints of high gloss with comparatively small proportions of resinous binder which comprises a volatile solvent, a coloring matter, and 20 to 75% of a resinous polymer of dihydronaphthalene having an average molecular weight of at least 400 and a melting point of 97° to 103° C.

8. A rotogravure printing ink of low viscosity and capable of producing prints of high gloss with comparatively small proportions of resinous binder which comprises a volatile solvent, a pigment, and 20 to 75% of a colorless, transparent, resinous polymer of dihydronaphthalene having an average molecular weight above 400, being substantially free of dimers and having a refractive index of approximately 1.60 and a density of about 1.0.

THOMAS A. MARTONE.
CHARLES S. ROWE.